US010795006B2

(12) United States Patent
Garcia et al.

(10) Patent No.: US 10,795,006 B2
(45) Date of Patent: Oct. 6, 2020

(54) 3D TIME-OF-FLIGHT CAMERA SYSTEM AND POSITION/ORIENTATION CALIBRATION METHOD THEREFOR

(75) Inventors: Frederic Garcia, Esch-sur-Alzette (LU); Frederic Grandidier, Saint-Max (FR); Bruno Mirbach, Konz (DE); Roberto Orsello, Luxembourg (LU); Thomas Solignac, Luttange (FR)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 936 days.

(21) Appl. No.: 13/058,962

(22) PCT Filed: Apr. 27, 2009

(86) PCT No.: PCT/EP2009/055054
§ 371 (c)(1),
(2), (4) Date: May 6, 2011

(87) PCT Pub. No.: WO2010/018009
PCT Pub. Date: Feb. 18, 2010

(65) Prior Publication Data
US 2011/0205340 A1    Aug. 25, 2011

(30) Foreign Application Priority Data
Aug. 12, 2008 (EP) ...................................... 08162222

(51) Int. Cl.
*G01S 7/497* (2006.01)
*G01S 17/89* (2020.01)
(Continued)

(52) U.S. Cl.
CPC ............ *G01S 7/4972* (2013.01); *G01S 17/08* (2013.01); *G01S 17/89* (2013.01); *G06T 7/80* (2017.01);
(Continued)

(58) Field of Classification Search
None
See application file for complete search history.

(56) References Cited

U.S. PATENT DOCUMENTS

| | | | | |
|---|---|---|---|---|
| 5,259,037 A | * | 11/1993 | Plunk | G01C 11/02 382/154 |
| 5,699,444 A | * | 12/1997 | Palm | G01C 11/06 382/106 |

(Continued)

OTHER PUBLICATIONS

"Vision and Inertial Sensor Cooperation Using Gravity as a Vertical Reference". Lobo et al., IEEE Transactions on Pattern Analysis and Machine Intelligence, vol. 25, No. 12, pp. 1597-1608, Dec. 2003.*

(Continued)

*Primary Examiner* — Kaitlin A Retallick
(74) *Attorney, Agent, or Firm* — Reising Ethington P.C.

(57) ABSTRACT

A camera system comprises a 3D TOF camera for acquiring a camera-perspective range image of a scene and an image processor for processing the range image. The image processor contains a position and orientation calibration routine implemented therein in hardware and/or software, which position and orientation calibration routine, when executed by the image processor, detects one or more planes within a range image acquired by the 3D TOF camera, selects a reference plane among the at least one or more planes detected and computes position and orientation parameters of the 3D TOF camera with respect to the reference plane, such as, e.g., elevation above the reference plane and/or camera roll angle and/or camera pitch angle.

21 Claims, 3 Drawing Sheets

(51) Int. Cl.
  *G01S 17/08* (2006.01)
  *G06T 7/80* (2017.01)
(52) U.S. Cl.
  CPC ............... *G06T 2207/10028* (2013.01); *G06T 2207/30196* (2013.01)

(56) References Cited

U.S. PATENT DOCUMENTS

| | | | | |
|---|---|---|---|---|
| 7,741,961 | B1* | 6/2010 | Rafii | B60Q 9/005 |
| | | | | 340/435 |
| 9,578,310 | B2* | 2/2017 | Baele | G06T 7/80 |
| 2008/0064952 | A1* | 3/2008 | Li | A61B 5/06 |
| | | | | 600/424 |
| 2009/0086014 | A1* | 4/2009 | Lea | G01C 11/00 |
| | | | | 348/25 |

OTHER PUBLICATIONS

Alessandro Bevilacqua, et al.; "People tracking using a Time-of-Flight depth sensor"; IEEE International Conference On Video and Signal Based Surveillance, 2006. AVSS, Nov. 1, 2006; XP002509695.
Andrew Fitzgibbon, et al.; "Direct Least Square Fitting of Ellipses"; Tern Analysis and Machine Intelligence, vol. 21, No. 5, May 1999; pp. 476-480.
Christopher Jaynes, "Multi-view calibration from planar motion trajectories" Image and Vision Computing Guildford, GB, vol. 22, No. 7, Jul. 1, 2004, pp. 535-550, XP002464738.
Frederic Garcia Becerro; "External-Self-Calibration of a 3D time-of-flight camera in real environments" [Online] Jun. 18, 2008, pp. 1-96, XP002509694.
H. Cantzler; Random Sample Consensus (RANSAC); Institute for Perception, Action and Behaviour, Division of Informatics, University of Edinburgh, Edinburgh, EH1 2QL, UK; pp. 1-4.
International Search Report; PCT/EP2009/055054; dated Jun. 15, 2009.
J.-A. Beraldin, S. F., et al.; "Practical Range Camera Calibration"; Institute for Information Technology; National Research Council of Canada; Ottawa, Canada K1A 0R6; pp. 1-11.
Martin A. Fischler, et al.; "Random Sample Consensus: A Paradigm for Model Fitting with Applications to Image Analysis and Automated Cartography"; Graphics and Image Processing; Jun. 1981; vol. 24, No. 6, pp. 381-395.
Neven Santrac, et al.; "High Resolution Segmentation with a Time-of-Flight 3D-Camera using the Example of a Lecture Scene"; Freie Universitat Berlin; Department of Mathematics and Computer Science; Takustr. 9, 14195 Berlin, Germany; {santrac, fland, rojas}@inf.fu-berlin.de; B-06-09; Sep. 2006.
T. Kahlmann, et al.; "Calibration for Increased Accuracy of the Range Imaging Camera Swissranger"; ISPRS Commission V Symposium 'Image Engineering and Vision Metrology', IAPRS vol. XXXVI, Part 5, Dresden Sep. 25-27, 2006; pp. 136-141.

* cited by examiner

3D TIME-OF-FLIGHT CAMERA SYSTEM AND POSITION/ORIENTATION CALIBRATION METHOD THEREFOR

TECHNICAL FIELD

The present invention generally relates to the technical field of 3D computer vision, in particular to a position/orientation calibration method for a 3D time-of-flight camera system.

BACKGROUND

As used herein, a 3D time-of-flight camera (hereinafter "3D TOF camera" or simply "camera") designates a camera that acquires images (herein called "range images") containing distance information pertaining to a scene by using the time-of-flight measurement principle. Such camera generally comprises a light source emitting modulated or pulsed light into the scene to be imaged in 3D and a pixel array on which the scene is imaged by an optical system. The camera then correlates the light detected in the pixels with the light emitted and determines, for each pixel, the phase difference between emitted and received light, or the difference between emission and reception times. These quantities are proportional to the radial distance between the camera and the part of the scene that is imaged onto the pixel concerned. Some 3D TOF cameras are known that acquire range images in real time.

The fields of application of 3D TOF cameras are many and diverse. It has been proposed to employ such 3D TOF cameras in the automotive field, e.g. for passenger detection and classification in a vehicle, for monitoring the surroundings of a car. 3D TOF cameras have also been suggested for controlling access to restricted areas (e.g. in airports, banks or public buildings), in particular for detecting, tracking and counting of persons and objects. An important advantage of 3D TOF camera systems is that the depth (or range) information is readily available and does not require cost-intensive computation as, for instance, in stereoscopic systems.

To the knowledge of the inventors, position and orientation calibration of 3D TOF cameras currently requires the person installing the camera to go through relatively complicated procedures, which might hinder the success of such cameras on the market place. Beraldin et al. present in their paper "Practical Range Camera Calibration" Proc. Soc. Photo-Opt. Instum. Eng. a calibration procedure adapted to a range camera intended for space applications. They propose a two-step methodology to perform the calibration, the first step being a specific calibration for the close-range volume (from 0.5 m to 1.5 m). In this first step, they use an array of targets positioned at known locations in the field of view of the range camera using a precise linear stage. In the second step, they propose to use a smaller number of targets positioned at distances greater than 1.5 m with the help of an accurate electronic distance-measuring device. As is depicted in this paper, reference points in the scene are used in order to perform the calibration process. The paper "High Resolution Segmentation with a Time-of-Flight 3D-Camera using the Example of a Lecture" Scene by Santrac et al. (Freie Universität Berlin, 2006) deals with the combination of range images from a 3D TOF camera and images from a 2D camera. To map the images to the two cameras, a calibration step is performed prior to using the camera combination for segmentation. For this purpose, a calibration pattern with at least 5×5 characteristic points is put in front of the two cameras in such a way that the points are distributed as evenly as possible on the screen of both cameras. In the paper "Calibration for increased accuracy on the range imaging camera Swissranger", ISPRS Commission V Symposium 'Image Engineering and Vision Metrology', XXVI, Part 5, Dresden 25-27 September 2006, Kahlmann et al. present a characterization of the Swissranger SR-2 camera and the sensor calibration method that allowed them to increase the accuracy of the camera. In this case, the calibration process was based on photogrammetric calibration using a 5×5 matrix of reference points represented by NIR LEDs.

Real-time or near real-time calculation of scene coordinates from image data acquired with a 3D (time-of-flight) camera requires the knowledge of the transformation matrix from the camera to the world coordinate system comprising the camera's orientation and position parameters. For real-world applications like surveillance of traffic crossings, buildings or production areas, camera positioning and orientation may differ from installation to installation which currently implies that for each individual installation an external camera calibration has to be performed. As indicated above, state-of-the art methods require some boards with known reference coordinates to be precisely installed. The installation of such calibrations tools can time-consuming and—depending on the available space—intricate, if not impossible.

BRIEF SUMMARY

The invention facilitates installation, in particular position and orientation calibration, of a 3D TOF camera.

A position and orientation calibration method for a camera system including a 3D TOF camera comprises
acquiring a camera-perspective range image of the scene to be imaged using the 3D TOF camera,
detecting one or more planes (i.e. planar surfaces) within the range image and selecting a reference plane among the one or more planes detected,
computing position and orientation parameters of the 3D TOF camera with respect to the reference plane. Such position and orientation parameters preferably include at least one, preferably two and most preferably all, of elevation above the reference plane (i.e. distance between the camera and the reference plane), camera roll angle and camera pitch angle.

As those skilled will appreciate, the proposed method, which is expected to be typically carried out as one of the last steps of installation of a 3D TOF camera, does not require using any predefined calibration pattern or calibration tool that mark predefined reference points in the scene. For the purposes of the present method, it is sufficient that a region in the camera field of view corresponds to a plane that has a known orientation with respect to the world coordinate system. Typically, this reference plane would be the floor in scene. The proposed method takes profit from the fact that a 3D camera provides 3D data points of the scene in camera perspective (i.e. in the camera coordinate system). By fitting a model plane to these 3D-data acquired by the camera, it is possible to compute a system of at least 3 equations (at least three points are needed to define a plane), which provides the relation between the world and the camera coordinate systems. By solving this system, one may determine the above-mentioned camera position and orientation parameters: roll angle, pitch angle and elevation of the camera with respect to the reference plane. For the purposes of the present, we will use the convention that the camera points to the negative camera-z-axis, and that the camera-x axis and the camera-y axis are oriented perpendicular one another and the camera-z-axis to the camera. Except for these restrictions, camera-x and camera-y-axes can otherwise be freely selected. In the context of the present, "roll angle" designates an angle measuring rotation about the camera-x-axis and "pitch angle" designates an angle measuring rotation about the camera-y-axis. To the inventors' best knowledge, this is the first calibration method that allows determining orientation and position parameters of a 3D TOF camera in non-lab conditions by taking profit of the raw data provided and without using predefined reference points in the scene (i.e. points that have to be marked in the actual scene in such a way that they can be identified in the range image).

It is to be noted that for the present method, the internal camera calibration should have been carried out beforehand, e.g. in the camera factory. As used herein, "internal calibration" designates calibration of camera parameters, which are independent of the location where the camera is installed, e.g. optical system parameters such as focal length, principal point location and lens distortion. A method of internal camera calibration is disclosed, e.g. in EP 1 662 440 A1. In contrast to internal calibration, the present method addresses "external calibration", i.e. calibration of parameters, which do depend on the location where the camera is installed.

Whatever is the intended field of application of a 3D TOF camera system, the range images provided are preferably evaluated automatically. For this purpose, the range images have to be processed by appropriate means, such as e.g. object or pattern recognition software. One of the benefits of the present invention is that the same software can be used on range images provided by 3D TOF cameras mounted in different locations, since method proposed allows compensating for position and/or orientation differences between the cameras.

A further aspect of the invention concerns a camera system configured and arranged for carrying out the position and orientation calibration method. Such system comprises a 3D TOF camera for acquiring a camera-perspective range image of a scene and an image processor for processing the range image. The image processor contains a position and orientation calibration routine implemented therein in hardware and/or software, which position and orientation calibration routine, when executed by the image processor, detects one or more planes within a range image acquired by the 3D TOF camera, selects a reference plane among the at least one or more planes detected and computes position and orientation parameters of the 3D TOF camera with respect to the reference plane, such as, e.g., elevation above the reference plane and/or camera roll angle and/or camera pitch angle.

The detection of one or more planes within the range image may be carried out using RANSAC-based plane detection. RANSAC (RANdom SAmple Consensus) is an algorithm for fitting of models, which is particularly robust against outliers. A short description of the RANSAC algorithm is given in the paper "Random Sample Consensus (RANSAC)" by H. Cantzler (University of Edinburgh), a more detailed one is given in M. A. Fischler and R. C. Bolles: "Random sample consensus: A paradigm for model fitting with application to image analysis and automated cartography", Communications of the ACM, 24(6):381-395, 1981.

Whether a RANSAC algorithm is used or not, the detection of one or more planes may advantageously comprise compensating for range errors induced by light spreading in the 3D TOF camera and/or discarding image pixels containing range information deemed unreliable (e.g. pixels having too little brightness or outliers). A preferred method for compensating the effects of light spreading is described in European patent application 07 024 505.5.

Preferably, the selection of a reference plane out of the planes detected comprises identifying a floor plane and fixing the floor plane as the reference plane. It is expected that in most applications the floor will lie in the field of view of the camera, since surveillance cameras are commonly mounted in an elevate position above and directed downward to the area to be monitored. Most preferably, the selection of the reference plane is effected autonomously by the calibration routine based upon and following input of user-defined limits of camera roll angle and/or camera pitch angle with respect to the floor plane. It may happen that the scene imaged by the camera contains more than one planar surface (floor and walls for instance). In this case, the person who installs the camera may input rough orientation indications (like: "roll angle between −45° and +45°", "pitch angle between −90° and 0°", etc.) in order to allow the camera to determine the floor plane autonomously.

The selection of the reference plane may also comprise the presentation of the one or more detected planes using a user interface and fixing of the reference plane based upon user interaction.

If the method requires some interaction with the user, the camera system preferably comprising a user interface for presenting output data to and/or receiving input data from a user. Such user interface may, for instance, comprise a display screen, a keyboard or a keypad, a touchscreen, etc. As an alternative, the camera system could comprise a hardware interface allowing a user to temporarily connect a user interface (e.g. a laptop) for setting up the system. Preferably, a user interface comprises a display screen enabling the person installing the camera to visualize the scene in the camera perspective. If the person also has to select a plane, the one or more planes detected could be indicated on the display screen (e.g. in different colours).

Preferably, the calibration routine comprises computing coordinate transformation parameters of the coordinate transformation between the camera coordinate system and the world coordinate system. Such coordinate transformation transforms, when applied to a camera-perspective range image of the scene, such range image into a Cartesian representation of the scene, in which coordinates are defined with respect to the reference plane. The camera system preferably comprises a memory, in which the coordinate transformation parameters may be stored.

As will be appreciated, the camera system as presented herein is suitable, in particular for pedestrian detection at crosswalks, since the scene imaged in such application typically comprises an extended floor plane that may serve as the reference plane.

BRIEF DESCRIPTION OF THE DRAWINGS

Further details and advantages of the present invention will be apparent from the following detailed description of not limiting embodiments with reference to the attached drawings, wherein.

DETAILED DESCRIPTION

Figure 2:
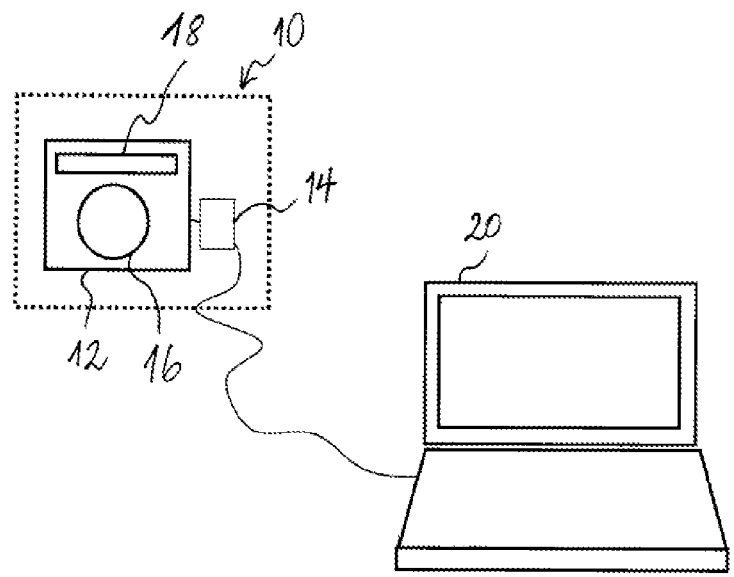
FIG. 2 is a schematic illustration of a 3D TOF camera system.

FIG. 2 shows a schematic illustration of a 3D TOF camera system 10, comprising a 3D TOF camera 12 and an image processor 14 (shown as an element separate from the camera 12, but which may also be incorporated with it in the same housing). The camera comprises an optical imaging system, illustrated by lens 16, and an illumination unit, illustrated by LED array 18, for illuminating the scene to be imaged with modulated or pulsed light. The camera system also comprises a hardware interface, e.g. a USB port, a firewire port, etc. (not shown in the drawing) allowing the connection of a user interface (in this case a laptop computer 20)

Range images acquired with a 3D TOF camera correspond to matrices of distance values d, which indicate the distances from the camera to the imaged surface elements. Given the internal camera parameters of the camera (e.g. focal length, principal point of the camera, and distortion parameters), the 3D coordinates $^c[X,Y,Z]^T$ of the visible surface elements within the scene can be determined with reference to the camera coordinate system. Coordinates expressed with reference to the camera coordinate system are preceded with a superscript "c" for distinction with coordinates expressed in the world coordinate system (i.e. with respect to the reference plane), which are preceded by a superscript "w". In a possible embodiment this is achieved by computing the product between the acquired distance value at each pixel and a unit vector $^c[e_x,e_y,e_z]^T$ defined according to the internal camera parameters for each pixel. This computation is explained in EP 1 662 440 A1, incorporated herein by reference in its entirety.

Figure 1:
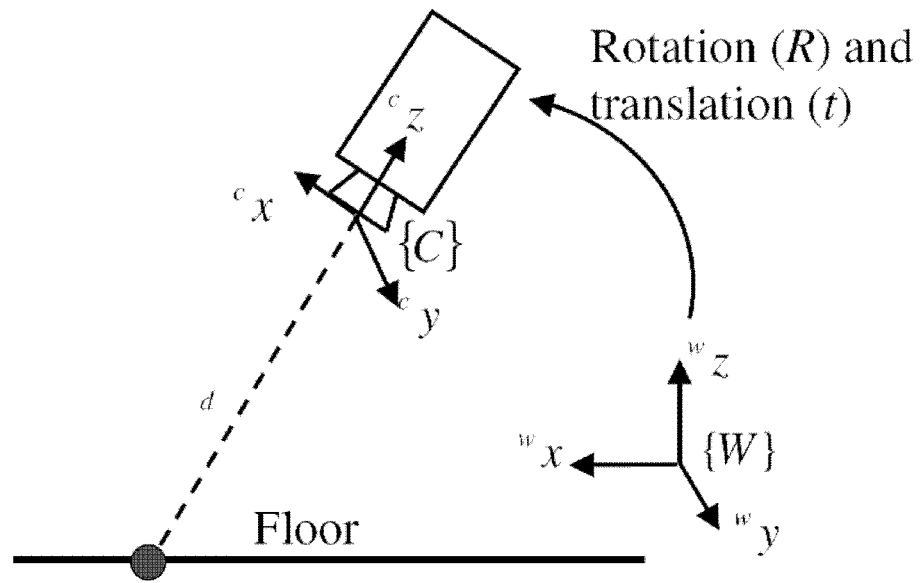
FIG. 1 is a schematic diagram illustrating the relationship between world and the camera coordinate systems.

As far as the relationship between the world coordinate system {W} and the camera coordinate system {C} is composed of a rotation matrix (3×3) and a translation vector (as illustrated in FIG. 1), the following equation can be defined:

$$^w\tilde{M}=[Rt]\cdot{^c\tilde{M}} \quad (1)$$

where $\tilde{M}$ represents a coordinate vector augmented by 1 as the last element $\tilde{M}=[X,Y,Z,1]^T$ to allow the homography representation between the camera and the world coordinate systems.

This rotation matrix R is presented using Euler angles α, β and γ that define a sequence of three elementary rotations around z, y and x-axis respectively. One normally uses the convention that the rotations are performed clockwise, first around the z-axis, then around the y-axis already once rotated, and finally around the x-axis that is already twice rotated during the previous stages:

$$[R]=[R_z]\cdot[R_y]\cdot[R_x] \quad (2)$$

where the elementary rotation matrices $[R_z]$, $[R_y]$ and $[R_x]$ are given by:

$$[R_z] = \begin{bmatrix} \cos\alpha & -\sin\alpha & 0 \\ \sin\alpha & \cos\alpha & 0 \\ 0 & 0 & 1 \end{bmatrix} \quad (3)$$

$$[R_y] = \begin{bmatrix} \cos\beta & 0 & \sin\beta \\ 0 & 1 & 0 \\ -\sin\beta & 0 & \cos\beta \end{bmatrix} \quad (4)$$

$$[R_x] = \begin{bmatrix} 1 & 0 & 0 \\ 0 & \cos\gamma & -\sin\gamma \\ 0 & \sin\gamma & \cos\gamma \end{bmatrix} \quad (5)$$

By substituting the rotation matrices (3,4,5) in (2), the resulting rotation matrix that defines camera orientation is:

$$[R] = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \quad (6)$$

Hence, from (1):

$$\begin{bmatrix} ^wX \\ ^wY \\ ^wZ \\ 1 \end{bmatrix} = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma & t_x \\ \sin\alpha\cos\beta & \sin\alpha\sin\beta\sin\gamma + \cos\alpha\cos\gamma & \sin\alpha\sin\beta\cos\gamma - \cos\alpha\sin\gamma & t_y \\ -\sin\beta & \cos\beta\sin\gamma & \cos\beta\cos\gamma & t_z \\ 0 & 0 & 0 & 1 \end{bmatrix} \begin{bmatrix} ^cX \\ ^cY \\ ^cZ \\ 1 \end{bmatrix} \quad (7)$$

To simplify the notation, we denote the matrix element in the $i^{th}$ row and the $j^{th}$ column of the rotation matrix R by $a_{ij}$. From (7):

$$\begin{bmatrix} ^wX \\ ^wY \\ ^wZ \\ 1 \end{bmatrix} = \begin{bmatrix} a_{11} & a_{12} & a_{13} & t_x \\ a_{21} & a_{22} & a_{23} & t_y \\ a_{31} & a_{32} & a_{33} & t_z \\ 0 & 0 & 0 & 1 \end{bmatrix} \begin{bmatrix} ^cX \\ ^cY \\ ^cZ \\ 1 \end{bmatrix} \quad (8)$$

As long as no external calibration of the camera has been performed, only the coordinates of the 3D scene points with reference to the camera coordinate system, i.e. $^c[X,Y,Z]$, are known. In order to determine the transformation matrix [R t] between the camera and the world coordinate system, it will be necessary to fix some constraints on the data.

In the following, we will assume that the scene imaged by the camera contains the floor and that it has been selected in the calibration routine as the reference plane.

The fact of having selected a plane in the scene allows us to fix the Z coordinate of the points contained in that plane, with reference to the world coordinate system, to a specific value. For convenience, this coordinate will be fixed to 0. Thus, considering $^wZ=0$, it follows from (8):

$$\begin{cases} {}^wX = a_{11}^c X + a_{12}{}^c Y + a_{13}{}^c Z + t_x \\ {}^wY = a_{21}^c X + a_{22}{}^c Y + a_{23}{}^c Z + t_y \\ 0 = a_{31}^c X + a_{32}{}^c Y + a_{33}{}^c Z + t_z \end{cases} \quad (9)$$

The last equation of the system of equations in (9) is the one of interest. This equation presents 4 unknown variables $[a_{31}\ a_{32}\ a_{33}\ t_z]$ that implies that at least 4 points $[{}^cX_k, {}^cY_k, {}^cZ_k]$, k=1, . . . n belonging to the floor are necessary to solve the following system of equations:

$$\begin{cases} 0 = a_{31}{}^c X_1 + a_{32}{}^c Y_1 + a_{33}{}^c Z_1 + t_z \\ \quad\quad\quad \vdots \\ 0 = a_{31}{}^c X_n + a_{32}{}^c Y_n + a_{33}{}^c Z_n + t_z \end{cases} \quad (10)$$

where n≥14. The more points coming from the floor, the more accurate will be the value of each unknown variable.

One way to efficiently solve the system in (10) is by writing (10) in matrix form $$\begin{pmatrix} 0 \\ \vdots \\ 0 \end{pmatrix} = \begin{pmatrix} {}^cX_1 & {}^cY_1 & {}^cZ_1 & 1 \\ \vdots & \vdots & \vdots & \vdots \\ {}^cX_n & {}^cY_n & {}^cZ_n & 1 \end{pmatrix} \begin{pmatrix} a_{31} \\ a_{32} \\ a_{33} \\ t_z \end{pmatrix} \quad (11)$$

and applying singular value decomposition (SVD), which is described, for instance, in "Matrix Computations", 3$^{rd}$ edition, 1996, Johns Hopkins University Press, Baltimore, by Golub et al.

From the SVD computation, the singular vector that corresponds to its smallest singular value gives the least square approximation to its solution, but up to a scale factor called λ. Therefore, from the SVD computation, instead of $[a_{31}\ a_{32}\ a_{33}\ t_z]$ values, what results is $[v_1\ v_2\ v_3\ v_4]$, with:

$a_{31} = \lambda \cdot v_1$ $a_{32} = \lambda \cdot v_2$ $a_{33} = \lambda \cdot v_3$ $t_z = \lambda \cdot v_4 \quad (12)$ In order to fix the correct value for the unknown variables $[a_{31}\ a_{32}\ a_{33}]$ it is necessary to determine the λ value. Since the unknown variables correspond to the last rotation matrix row and from one of the orthogonal rotation matrix properties:

$R^T \cdot R = I \quad (13)$ where I represents the unity matrix, the following constraint can be defined:

$a_{31}^2 + a_{32}^2 + a_{33}^2 = 1 \quad (14)$

The scale factor λ can be determined arranging the equations in (12) in the previous constraint (14) as follows:

$$\lambda = \pm \sqrt{\frac{1}{v_1^2 + v_2^2 + v_3^2}} \quad (15)$$

There a two possible solutions, differing by the sign. For the following, the solution of λ will be considered, for which the matrix coefficient $a_{33}$ (see equation (12)) is positive. This solution corresponds to the situation where the normal vector of the floor corresponds to the z-axis of the world coordinate system, such that the origin of the camera reference system has a positive z-component in the world coordinate system.

Alternatively to the SVD computation, a direct Least Square computation involving the constraint of equation (14) can be computed, e.g. as is presented in "Direct Least Square Fitting of Ellipses", Tern Analysis and Machine Intelligence, Vol. 21, No. 5, May 1999, by Fitzgibbon et al. By computing the scatter matrix of the transformation matrix between the camera coordinate system and the world coordinate system in (11) a 4×4 matrix is obtained. This matrix can be combined with the constraining matrix of (14), yielding a generalised eigensystem that has to be solved. The lower computational cost of the direct Least Squares method in comparison to the SVD makes it suitable for implementation on real microprocessors.

Once the value of λ is fixed, the unknown variables can be automatically estimated by substituting λ in (12). What is thus directly determined is the translation $t_z$ in z-direction as well as the 3$^{rd}$ row of the rotation matrix (6):

$$\begin{cases} a_{31} = -\sin\beta \\ a_{32} = \cos\beta \sin\gamma \\ a_{33} = \cos\beta \cos\gamma \end{cases} \quad (16)$$

Equation (16) can be solved for obtaining the rotation angles β and γ as follows:

$\beta = \arcsin(-a_{31}) \quad (17)$ $\gamma = \arctan\left(\frac{a_{32}}{a_{33}}\right) \quad (18)$ Notice that there are two possible values for β and γ leading to the same solution. Limiting the range of the angle γ to a half-circle, e.g. to the interval $[-\pi/2, \pi/2]$ the solution becomes unambiguous. This constraint would means that the camera is assumed to be rotated around the x-axis less than 90° from the initial orientation in which the camera coordinate system coincides with the world coordinate system.

From these computations, angles β and γ, which correspond to pitch and roll rotations, respectively, have been estimated. The remaining angle to complete the rotation matrix is the yaw angle α, which can be fixed to an arbitrary value, e.g. 0° for convenience. The translation vector t can be fixed to $[0,0,t_z]^T$ which means that the origin of the world coordinate system lies vertically underneath the origin of the camera coordinate system. Thus, the transformation matrix presented in (1) may be fully determined using the floor as the reference plane.

The method as presented so far in this detailed description corresponds to that part of the external camera calibration, which follows the selection of the reference plane. In the following, we will address the detection of planes in the scenes and the selection of a reference plane in more detail. When objects (e.g. furniture or people) and/or more than one plane (roof or walls) are present in the scene, robust fitting routines have to be used to detect the plane or planes within the scene. In order to distinguish between points in the range image belonging to a plane and points belonging to an object, a RANSAC based plane detection is preferably used. The RANSAC algorithm is an iterative algorithm for robust fitting of models. It is robust in the sense of good tolerance to outliers in the experimental data. Its structure is simple but powerful, based on the following steps: first, the algorithm randomly selects three points of the range image and computes the number of inliers belonging to the plane (with some error tolerance) spanned by the three points. The algorithm then goes on by selecting three new points and making the same operations until no more data can be fitted on a plane or until a predefined number of iterations is reached. Those three points that define the best plane(s) (with the highest number of inliers) will be returned by the algorithm. The planes defined by the different point triplets are not necessarily the best fit to the planes actually present in the scene. Accordingly, a better estimation of the plane parameters may be computed using e.g. a Least Squares method. As will be appreciated, points belonging to objects or persons in the scene will normally be discarded since they do not belong to a plane.

It cannot be assumed a priori that only one plane is present in the scene. A strategy has therefore to be adopted for selecting a reference plane out of the planes detected. If only one plane is detected, in most surveillance applications one may assume with a reasonable degree of certainty that this plane is a floor plane and the calibration routine could fixing that plane as the reference plane. If more than one plane is detected some input should be provided to the calibration routine by the person installing the camera.

If the camera is looking to the floor, the floor can be discriminated from other planes in the scene (e.g. the ceiling or walls) as follows: the camera is installed above the floor, the estimated z-coordinate $t_z$ of the camera in the world coordinate system is positive (where it is assumed that the world coordinate system is so oriented that points above the floor level have a positive z-coordinate). Any ceiling above the camera can easily be discarded from the set of candidates of the floor plane by imposing the condition $t_z>0$ to the detected planes for being further considered. By requiring the pitch angle $\beta$ around the y-axis to lie in the interval $[-\pi/4,\pi/4]$, the condition $|a_{3,1}|=|\sin \beta|<\sqrt{2}/2$ can be imposed on detected planes for being further considered. As the estimated rotation matrix coefficient $a_{31}$ is the projection of the camera x-axis onto the normal vector of the calibration plane, the above condition allows to discard side-walls, i.e. walls that are parallel to the world z-axis. Mounting situations in which the camera shall be rotated around the y-axis by more than $\pi/4$ can also be handled. In these cases, the user would have to indicate on the user interface, in which of the four possible quadrants the roll angle lies, such that the range image can be rotated accordingly by 0, $\pi/2$, $\pi$, $3\pi/2$ prior to applying the calibration method. Indicating the quadrant of the roll angle basically corresponds to indicating to the camera, which of its sides is the upper side.

Those skilled will note that, in principle, any plane detected in the range image can be used as the reference plane if the relative orientation of the detected plane with respect to the world coordinate system is indicated (directly or indirectly, e.g. via indicating the camera's upper side or bottom side). The calibration routine preferably is configured to guide the user through the installation and could, for instance, ask the user to indicate an approximative orientation of the camera, e.g. whether the camera looks down or up and in which quadrant of the circle the roll angle lies. The calibration routine could also be configured to display (e.g. by means of colour, highlighting, or the like) the different planes detected within the range image and the user could be asked to indicate the reference plane to be selected.

Preferably, the user indicates the approximate camera orientation before plane detection is carried out. If the calibration routine is to be configured to select as the reference plane a plane, which has a predefined orientation with respect to the approximate camera orientation (e.g. the floor plane), some hypothetical planes spanned by randomly chosen point triplets in the RANSAC algorithm can immediately be discarded because their orientation is incompatible with the approximate camera orientation provided. Accordingly, the RANSAC algorithm is preferably optimised in such a way as to evaluate the cost function (normally the number of inliers) only for such point triplets that define hypothetical planes in agreement with the approximate camera orientation.

To further improve the calibration routine, contrast in the range image that serves as the basis for plane detection may be enhanced. Proceeding in this way reduces distance measurement errors caused by loss of contrast. In particular, the calibration routine is preferably configured to discard regions in the range image in which the amplitude of the modulation of the light reflected from the scene is below a certain predefined threshold (so that parts of the scene that are far from the non-ambiguity distance of the camera are eliminated) before it carries out plane detection, in order to reduce the pool of image points which have to be considered in the plane detection algorithm and thereby improve computation time.

Figure 3:
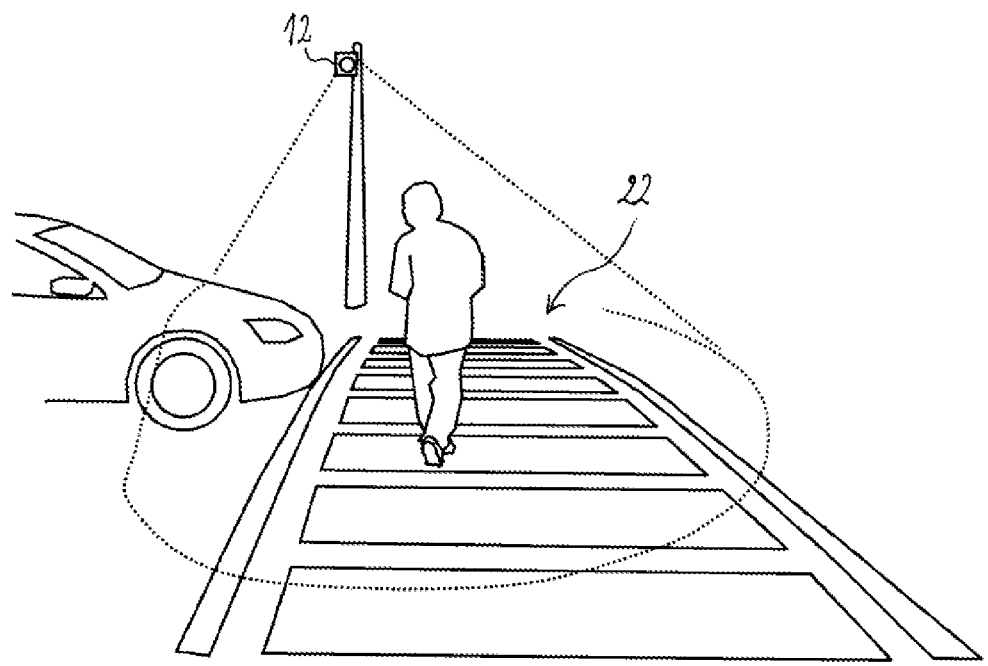
FIG. 3 is a perspective view of a crosswalk surveillance system including a 3D TOF camera.
Figure 4:
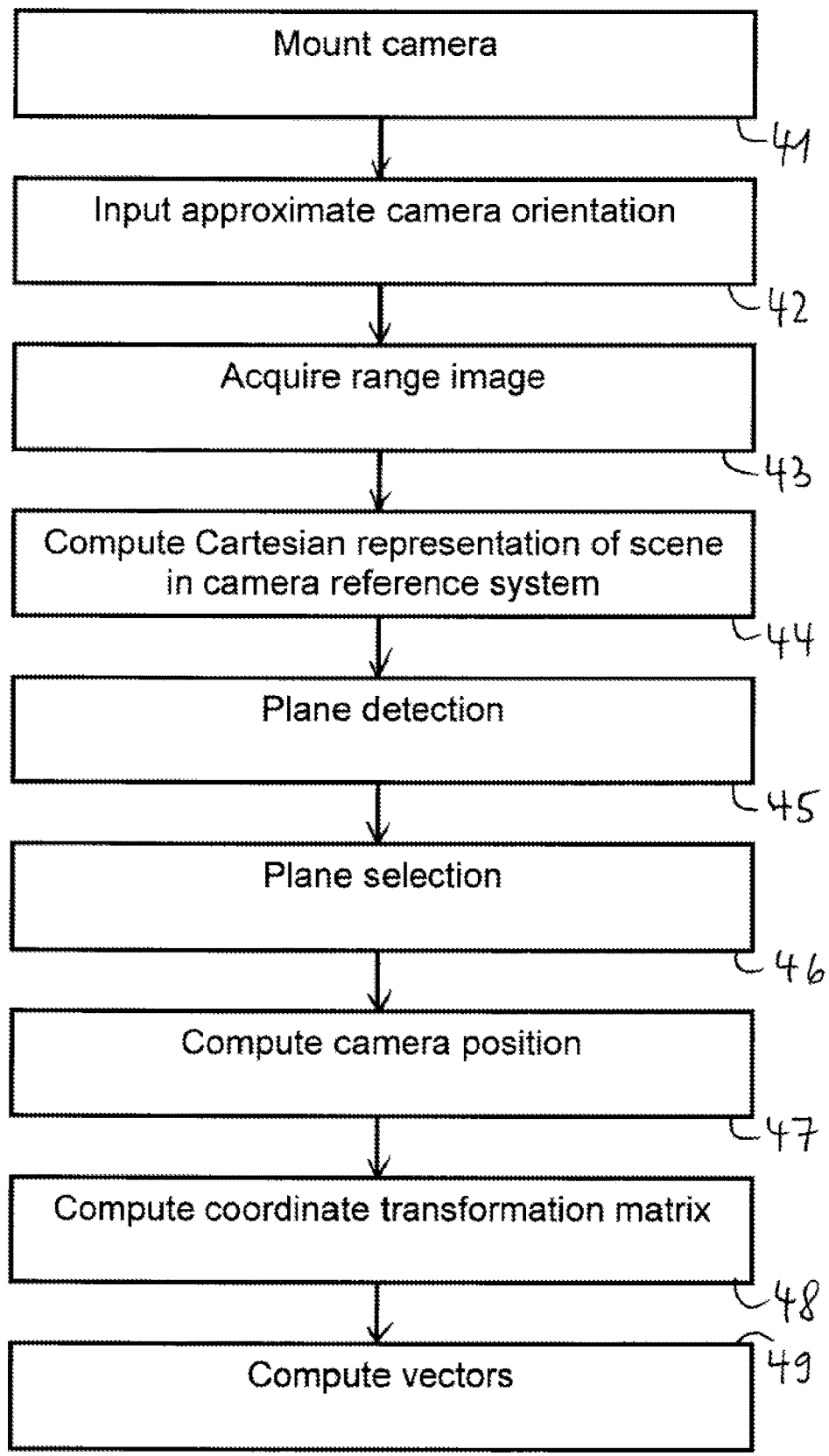
FIG. 4 is a flow diagram of a preferred method of installing a 3D TOF camera.

To summarize, a preferred method of installing a 3D TOF camera system will now be described with reference to FIG. 4. In a first step 41, the person (hereinafter: the user) in charge of installing the camera system mounts a 3D TOF camera 12 in the desired location, e.g. in an elevated position above a crosswalk 22, as illustrated in FIG. 3. Once the camera is correctly positioned and oriented (which should be verified by connecting a display screen to the camera or using a built-in display screen if one is available), the user starts a camera setup program, which comprises a camera calibration routine.

In step 42, the calibration routine asks the user to indicate the approximate orientation of the camera. It could do this, for instance, by proposing a set of pictograms or pictures illustrating different predefined camera positions and/or orientations and requesting the user to select the pictogram or picture that corresponds best to actual camera orientation. After that, camera orientation should not be changed any more; if such change should nevertheless be necessary, the setup program should be started anew. A range image of the scene to be monitored is then acquired in step 43. Provided that the camera orientation has not been changed in the meanwhile, a range image acquired beforehand (when the camera was mounted) could also be used for the calibration and step 43 be omitted.

The calibration routine then calculates the coordinates of the points of the range image in the camera coordinate system (in step 44), e.g. using the method proposed in EP 1 662 440 A1, whereby the optical parameters of the camera (known beforehand and stored in a memory of the camera) are taken into account. In EP 1 662 440 A1, the optical camera parameters are stored in form of a set of vectors, each vector belonging to a specific pixel of the range image. The coordinate calculation method of this step comprises, for each pixel, multiplying the range value determined for the pixel with that stored vector that corresponds to the specific pixel:

$$\begin{pmatrix} {}^c x_i \\ {}^c y_i \\ {}^c z_i \end{pmatrix} = d_i \cdot \begin{pmatrix} {}^c e_i^x \\ {}^c e_i^y \\ {}^c e_i^z \end{pmatrix} \quad (19)$$

where $d_i$ is the distance measured in the i-th pixel, $[{}^c e_i^x, {}^c e_i^y, {}^c e_i^z]^T$ is the vector stored for the i-th pixel, and the left-hand side is the coordinate vector of the image point in the camera reference system. The result of this step is a Cartesian representation of the scene in the camera coordinate system.

The next steps are plane detection (at reference numeral 45), which as described above, is preferably carried out using a RANSAC algorithm and selection of the reference plane among the planes detected (step 46). As mentioned, floor plane identification may be done autonomously (i.e. without user interaction at this stage), using e.g. the previously defined approximate orientation of the camera, or based upon user interaction (e.g. requesting the user to indicate the floor plane). At this stage of the procedure, the calibration routine has sufficient information to compute camera position (in terms of vertical distance from the reference plane) and orientation (roll and pitch angles with respect to the reference plane), which is thus carried out in step 47. As explained above, camera position and orientation translates into a coordinate transformation from the camera coordinate system into the world reference system. Accordingly, in step 48, the calibration routine computes this coordinate transformation (e.g. in form of a matrix) and combines it with the above coordinate calculation method, whereby a set of vectors $[{}^w e_i^x, {}^w e_i^y, {}^w e_i^z]^T$ is obtained in step 49, by means of which the distance values measured for each pixel may be directly converted into a point expressed by its coordinates in the world reference system:

$$\begin{pmatrix} {}^w e_i^x \\ {}^w e_i^y \\ {}^w e_i^z \end{pmatrix} = R \cdot \begin{pmatrix} {}^c e_i^x \\ {}^c e_i^y \\ {}^c e_i^z \end{pmatrix} \quad (20)$$

where R is given by equation (2). It should be noted that in a practical embodiment of the routine, the steps 48 and 49 could be implemented as a single step. From the range image (i.e. the set of pixels with distance values $d_i$), the coordinates of the points in the world reference system can be calculated by:

$$\begin{pmatrix} {}^w x_i \\ {}^w y_i \\ {}^w z_i \end{pmatrix} = d_i \cdot \begin{pmatrix} {}^w e_i^x \\ {}^w e_i^y \\ {}^w e_i^z \end{pmatrix} + \begin{pmatrix} t_x \\ t_y \\ t_z \end{pmatrix} \quad (21)$$

Once the calibration routine has been successfully executed, the data necessary for transforming the range images acquired by the camera into a Cartesian representation of the scene in the world coordinate system are the vectors $[{}^w e_i^x, {}^w e_i^y, {}^w e_i^z]^T$ and $[t_x, t_y, t_z]^T$. Nevertheless, the camera preferably keeps the vectors $[{}^c e_i^x, {}^c e_i^y, {}^c e_i^z]^T$ in memory in case the calibration has to be repeated (e.g. after servicing the camera).

As those skilled will appreciate, the present invention is suited for most applications of 3D TOF cameras and greatly facilitates installation of such cameras in a real-world environment.

The invention claimed is:

1. Position and orientation calibration method for a camera system including a 3D time-of-flight camera, said method comprising:
   acquiring a camera-perspective range image of a scene using said 3D time-of-flight camera, wherein the range image includes 3D data points representing surface elements within the scene;
   detecting one or more planes within said range image without using predefined reference points from the 3D data;
   selecting a reference plane among said one or more planes detected, said selecting of said reference plane comprising presenting said one or more detected planes using a user interface and fixing said reference plane based upon user interaction; and
   calibrating said 3D time-of-flight camera with respect to a position and orientation of said 3D time-of-flight camera by computing, using said reference plane, position and orientation parameters of said 3D time-of-flight camera with respect to said reference plane and a coordinate transformation matrix that transforms camera-perspective range images of said scene into Cartesian representations of said scene, in which coordinates are defined with respect to said reference plane.

2. The method as claimed in claim 1, wherein said position and orientation parameters of said 3D time-of flight camera include at least one of height above said reference plane, camera roll angle and camera pitch angle.

3. The method as claimed in claim 1, wherein said detection of one or more planes within said range image comprises RANSAC-based plane detection.

4. The method as claimed in claim 1, wherein said selecting of a reference plane comprises identifying a floor plane and fixing said floor plane as said reference plane.

5. The method as claimed in claim 4, wherein said selection of said reference plane is effected by said camera based upon and following input of user-defined limits of at least one of camera roll angle and camera pitch angle with respect to said floor plane.

6. The method as claimed in claim 1, further comprising storing said coordinate transformation matrix within a memory of said camera.

7. The method as claimed in claim 1, wherein said detection of one or more planes comprises at least one of compensating for range errors induced by light spreading in said 3D time-of-flight camera and discarding image pixels containing range information deemed unreliable.

8. A camera system comprising:
   a 3D time-of-flight camera configured to acquire a camera-perspective range image of a scene, wherein the range image includes 3D data points representing surface elements within the scene; and
   an image processor for processing said range image; and
   a user interface for presenting output data to and receiving input data from a user,
   wherein said image processor comprises a position and orientation calibration routine implemented in at least one of hardware and software, wherein said position and orientation calibration routine, when executed by said image processor, detects one or more planes within the range image acquired by said 3D time-of-flight camera without using predefined reference points from the 3D data, selects a reference plane among said one or more planes detected by presenting said one or more detected planes using said user interface and fixing said reference plane based upon user interaction and, using said reference plane, calibrates said 3D time-of-flight camera with respect to a position and orientation of said 3D time-of-flight camera by computing position and orientation parameters of said 3D time-of-flight camera with respect to said reference plane, and a coordinate transformation matrix that transforms camera-perspective range images of said scene into Cartesian representations of said scene, in which coordinates are defined with respect to said reference plane.

9. The camera system according to claim 8, wherein said position and orientation parameters comprise at least one of height above said reference plane, camera roll angle and camera pitch angle.

10. The camera system as claimed in claim 8, wherein said position and orientation calibration routine, when executed by said image processor, selects said reference plane by identifying a floor plane and fixing said floor plane as said reference plane.

11. The camera system as claimed in claim 8, wherein said calibration routine, when executed by said image processor, selects said reference plane based upon and following input, via said user interface, of user-defined limits of at least one of camera roll angle and camera pitch angle with respect to said floor plane.

12. The camera system as claimed in claim 8, comprising a memory, and wherein said calibration routine, when executed by said image processor, stores said coordinate transformation matrix within said memory.

13. Pedestrian detection system comprising a camera system as claimed in claim claim 8.

14. A camera system comprising:
a 3D time-of-flight camera configured to acquire a camera-perspective range image of a scene, wherein the range image includes 3D data points representing surface elements within the scene; and
an image processor for processing said range image,
wherein said image processor is configured to detect one or more planes within a range image acquired by said 3D time-of-flight camera without using predefined reference points from the 3D data, to select a reference plane among said one or more planes detected based upon user-defined limits of at least one of camera roll angle and camera pitch angle with respect to said reference plane and to calibrate said 3D time-of-flight camera with respect to a position and orientation of said 3D time-of-flight camera by computing position and orientation parameters of said 3D time-of-flight camera and a coordinate transformation matrix with respect to said reference plane, wherein the coordinate transformation matrix transforms camera-perspective range images of said scene into Cartesian representations of said scene, in which coordinates are defined with respect to said reference plane,
wherein said camera system comprises a memory,
and wherein said processor is further configured to store said coordinate transformation parameters within said memory.

15. The method as claimed in claim 1, wherein presenting said one or more detected planes comprises displaying said one or more detected planes within the range image and wherein said user interaction comprises requesting a user to indicate which one among the displayed planes is to be selected.

16. The method as claimed in claim 15, wherein displaying said one or more detected planes comprises highlighting said detected planes within the range image.

17. Position and orientation calibration method for a camera system including a 3D time-of-flight camera, said method comprising:
acquiring a camera-perspective range image of a scene using said 3D time-of flight camera, wherein the range image includes 3D data points representing surface elements within the scene;
detecting one or more planes within said range image without using predefined reference points from the 3D data and selecting a reference plane among said one or more planes detected, said selection of said reference plane being effected by said camera based upon and following input of user-defined limits of at least one of camera roll angle and camera pitch angle with respect to said reference plane; and
calibrating said 3D time-of-flight camera with respect to a position and orientation of said 3D time-of-flight camera by computing position and orientation parameters of said 3D time-of-flight camera and a coordinate transformation matrix with respect to said reference plane, wherein the coordinate transformation matrix transforms camera-perspective range images of said scene into Cartesian representations of said scene, in which coordinates are defined with respect to said reference plane.

18. The method as claimed in claim 17, wherein said selecting of a reference plane comprises identifying a floor plane and fixing said floor plane as said reference plane.

19. The method as claimed in claim 17, comprising prompting a user to input said limits of at least one of camera roll angle and camera pitch angle with respect to said reference plane.

20. The method as claimed in claim 17, comprising prompting a user to indicate rough orientation indications, said limits of at least one of camera roll angle and camera pitch angle with respect to said reference plane corresponding to said orientation indications or being derivable from them.

21. Position and orientation calibration method for a camera system including a 3D time-of-flight camera, said method comprising:
acquiring, using said 3D time-of-flight camera, a camera-perspective range image of a scene containing no predefined reference points identifiable as such by said 3D time-of-flight camera;
detecting one or more planes within said range image without using predefined reference points from the acquired range image and selecting a reference plane among said one or more planes detected; and
calibrating said 3D time-of-flight camera with respect to a position and orientation of said 3D time-of-flight camera by computing position and orientation parameters of said 3D time-of-flight camera and a coordinate transformation matrix with respect to said reference plane, wherein the coordinate transformation matrix transforms camera-perspective range images of said scene into Cartesian representations of said scene, in which coordinates are defined with respect to said reference plane.

* * * * *